(12) United States Patent
Langwieser et al.

(10) Patent No.: US 11,370,623 B2
(45) Date of Patent: Jun. 28, 2022

(54) DEVICES AND METHODS FOR SUPPLYING LIDS TO A CAN SEAMER

(71) Applicant: KRONES AG, Neutraubling (DE)

(72) Inventors: Sebastian Langwieser, Neutraubling (DE); Michael Trummet, Neutraubling (DE)

(73) Assignee: KRONES AG, Neutraubling (DE)

( * ) Notice: Subject to any disclaimer, the term of this patent is extended or adjusted under 35 U.S.C. 154(b) by 731 days.

(21) Appl. No.: 16/124,895

(22) Filed: Sep. 7, 2018

(65) Prior Publication Data

US 2019/0071197 A1 Mar. 7, 2019

(30) Foreign Application Priority Data

Sep. 7, 2017 (DE) ...................... 10 2017 120 703.1

(51) Int. Cl.
*B65G 59/06* (2006.01)
*B65B 7/28* (2006.01)

(52) U.S. Cl.
CPC .......... *B65G 59/066* (2013.01); *B65B 7/2807* (2013.01)

(58) Field of Classification Search
CPC ... B65B 7/2807; B65B 7/2842; B65B 7/2857; B65B 31/02; B21D 51/2692; B21D 51/32; B65G 59/066; B65G 59/108; B65G 33/06; B65G 33/04; B65G 57/307; B65G 59/10
See application file for complete search history.

(56) References Cited

U.S. PATENT DOCUMENTS

| | | | | |
|---|---|---|---|---|
| 2,840,963 A | * | 7/1958 | Osmond | B65B 7/2807 53/73 |
| 3,771,576 A | * | 11/1973 | Gellatly | B65B 43/60 141/150 |
| 5,113,636 A | * | 5/1992 | Mihara | B65B 7/2807 53/308 |
| 5,151,001 A | * | 9/1992 | Kawaguchi | B23Q 1/5468 198/377.08 |
| 5,476,362 A | * | 12/1995 | Kobak | B65G 59/067 221/17 |
| 5,653,576 A | * | 8/1997 | Pearce | B65G 47/71 198/803.15 |

(Continued)

FOREIGN PATENT DOCUMENTS

| | | |
|---|---|---|
| CN | 1045045 | 9/1990 |
| CN | 102530567 | 7/2012 |

(Continued)

OTHER PUBLICATIONS

Extended European Search Report from EP 18193098.3, dated Nov. 20, 2018, 7 pages.

(Continued)

*Primary Examiner* — Gregory W Adams
(74) *Attorney, Agent, or Firm* — Haynes and Boone, LLP

(57) ABSTRACT

A device for supplying lids to a can seamer includes a destacking screw for conveying lids that are fed in via a lid feed, for transferring the correctly separated lids to a downstream transport and/or treatment device, and for interrupting the supply of the lids to the downstream transport and/or treatment device in the event of an interruption of production. Methods for supplying lids to a can seamer are also provided.

7 Claims, 9 Drawing Sheets

(56) References Cited

U.S. PATENT DOCUMENTS

| | | | | |
|---|---|---|---|---|
| 5,931,341 A * | 8/1999 | Bittermann | ............ | B65B 7/2807 |
| | | | | 221/222 |
| 6,446,781 B1 * | 9/2002 | De Villele | ............. | B65G 47/71 |
| | | | | 198/364 |
| 7,284,577 B2 * | 10/2007 | Yoneda | .................. | B65G 33/04 |
| | | | | 141/129 |
| 8,286,408 B2 * | 10/2012 | Chauhan | ................. | B65B 23/14 |
| | | | | 53/443 |
| 8,464,856 B2 * | 6/2013 | Marshall | .................. | B23Q 7/02 |
| | | | | 198/459.2 |
| 8,490,778 B2 * | 7/2013 | Wolf | .................... | B65G 47/847 |
| | | | | 198/459.2 |
| 2004/0007438 A1 * | 1/2004 | Baranowski | .............. | B65B 1/04 |
| | | | | 198/459.2 |
| 2007/0056251 A1 | 3/2007 | Ruppman, Sr. et al. | | |
| 2016/0264269 A1 | 9/2016 | Schweigkofler | | |

FOREIGN PATENT DOCUMENTS

| | | |
|---|---|---|
| CN | 104093542 | 10/2014 |
| CN | 204568141 | 8/2015 |
| CN | 204896588 | 12/2015 |
| CN | 105966928 | 9/2016 |
| DE | 1105788 | 4/1961 |
| DE | 2021091 | 11/1970 |
| DE | 2550141 | 5/1977 |
| DE | 2754736 | 6/1978 |
| EP | 0322844 | 10/1993 |
| GB | 673476 | 6/1952 |

OTHER PUBLICATIONS

Chinese Office Action dated May 25, 2020, Application No. 201811043147.3, 8 pages.

* cited by examiner

DEVICES AND METHODS FOR SUPPLYING LIDS TO A CAN SEAMER

CROSS-REFERENCE TO RELATED APPLICATION

This application claims priority from German Patent Application No. DE 10 2017 120 703.1, filed on Sep. 7, 2017 in the German Patent and Trademark Office, the disclosure of which is incorporated herein by reference in its entirety.

BACKGROUND

Technical Field

The present invention relates to a device for supplying lids to a can seamer.

Related Art

Cans for beverages, cans for preserved foodstuffs and cans for non-food goods enjoy great popularity, since cans represent an ideal form of packaging for a variety of products. Cans are unbreakable and have low weight, as well as being inexpensive, easy to recycle and absolutely impermeable to light and oxygen.

Prior to being filled, the cans are in two parts, i.e., in the form of empty cans, which comprise the body and base of the can, and lids, which are usually designed as tear-off lids, and which are attached to the can, to form a gas-tight and fluid-tight package, only after the can has been filled.

The filling of cans takes place in a can filling plant, wherein the filling process takes place in a filler carousel and the process of closing the filled cans with the can lids takes place in a seamer disposed downstream of the filler carousel. This involves initially transporting the filled cans without closures, i.e., without lids, following the filling process in the filler carousel. Subsequent to filling, a lid is placed on each filled can by means of a can seamer. In the can seamer, the can lids that have been placed on the cans are attached to the filled cans by means of a seaming head and a seaming roller, i.e., seamed on.

For this process, the applicable can lids are supplied via an external lid feed. At the end of the lid feed there is a destacking screw with a retaining blade. The destacking screw separates the individual lids from the stack with the aid of a helical groove. The retaining blade is positioned such that it is disposed just above the destacking screw, such that in the event of an interruption of production the retaining blade holds the lids back, and releases them when production starts.

In known can seamers, the destacking screw is driven via the drive of the downstream transport and/or treatment device, i.e., the destacking screw is caused to rotate synchronously with the downstream transport and/or treatment device. If an interruption of production then occurs, so that the destacking screw does not now need to supply a lid, the retaining blade is extended such that it holds back the lids stored in the lid feed. In this position of the retaining blade, no further lids are conveyed, even though the destacking screw continues to rotate. If it is necessary to resume the supply of lids, the retaining blade is retracted and the destacking screw again conveys lids.

SUMMARY

Proceeding from the known state of the art, improved devices and methods for supplying lids to a can seamer are described.

Accordingly, a device for supplying lids to a can seamer is described, which includes a destacking screw for conveying lids that are fed in via a lid feed and for transferring the correctly separated lids to a downstream transport and/or treatment device. The device further includes a stopping device for interrupting the supply of the lids to the downstream transport and/or treatment device in the event of an interruption of production. The stopping device is formed by the destacking screw.

The device for supplying lids to a can seamer serves to provide lids for closing filled cans in a can filling plant. The can filling plant can be designed to fill cans for the beverage industry, cans for preserved foodstuffs or cans for non-food goods, in all possible and appropriate sizes.

The destacking screw is suitable for conveying the lids that are fed in via the lid feed and for transferring the lids, correctly separated, to a downstream transport and/or treatment device. For this purpose, the destacking screw has for example a helical groove, which in each case engages in a section of the rim of a can lid, and then transports the lid in the direction of the downstream transport and/or treatment device. In other words, the can lids are individually displaced out of the lid feed. The conveying of the lids takes place only when the destacking screw rotates.

"Correctly separated" transfer of the lids is to be understood as a transfer that is coordinated with the downstream transport and/or treatment device. Thus the transfer of the lids is not continuous, but synchronized, i.e., it takes place when a lid for a filled can that is to be closed needs to be supplied to the downstream transport and/or treatment device. This synchronization can be achieved, for example, via the geometry of the helical groove of the destacking screw, or via the geometry of the destacking screw itself, and/or via the drive of the destacking screw.

The downstream transport and/or treatment device receives the lids that are provided by the destacking screw. The downstream transport and/or treatment device then transports the lids that are provided by the destacking screw, for example to a further downstream transport and/or treatment device, or else it carries out a treatment step itself. Treatment steps can be, for example, gassing of the lids and/or sterilization of the lids, applying the lids to filled cans, or closing the cans by seaming on the lids.

The lids can, however, also be sterilized upstream of the destacking screw, for example on the lid stack from which they are removed by means of the destacking screw in order to dispense them individually. Subsequently, the head spaces of the cans that are to be closed can also be gassed, so that under-lid gassing takes place in this manner.

The downstream transport and/or treatment device can be designed in the form of rotating transfer and/or treatment starwheels. Linear transport devices, for example in the form of conveyor belts, are also possible.

The stopping device has the function of stopping, whenever necessary, the transfer of the lids that are fed in via the lid feed and conveyed by the destacking screw. By this means it is possible, for example, to prevent the conveying of further lids in the event that no cans to be closed are being conveyed in the downstream transport and/or treatment device, and therefore no lids need to be supplied.

In order to provide a stopping device, the conveying of lids is interrupted by stopping the destacking screw. The destacking screw thus fulfills both the function of a device for conveying the lids, and the function of a stopping device for withholding the can lids.

Due to the fact that the stopping device is formed by the destacking screw, an additional retaining device for withholding the lids in the event of an interruption of production is no longer necessary. It is therefore possible to dispense with the additional, generally pneumatically controlled, retaining blade assembly. Because this assembly can be dispensed with, the design of the device for supplying lids to a can seamer is simplified. This simplified design makes possible an improvement in the cleaning of the plant, which enables an overall improvement of product quality and stability.

Due to the fact that there is no necessity for an additional retaining device, for example in the form of a retaining blade, which would require time-consuming conversion and re-adjustment in the event of a change in the size and/or type of lid, conversion of the plant is simplified, and thus the changeover time when different containers are to be filled is significantly reduced. Because the destacking screw itself fulfills the function of a stopping device, and an additional retaining blade can therefore be dispensed with, the removal of fine metal shavings from the lids due to incorrect extension of the retaining blade is also avoided. Accordingly, there is no danger of damaging the lids when production is interrupted, and thus also no danger that detached metal shavings will enter the finished product. All in all, this results in higher product quality, better product stability and increased consumer safety.

In some embodiments, the destacking screw is driven independently of the downstream transport and/or treatment device. In contrast to the devices for supplying lids to a can seamer that are known from the state of the art, in which the destacking screw is driven via the drive of the downstream transport and/or treatment device, in the case of the present device for supplying lids to a can seamer, a separate drive for the destacking screw is provided, which can be operated independently of the drive of the downstream transport and/or treatment device.

By means of the separate drive of the destacking screw, in the event of an interruption of production, for example such that no cans to be closed are conveyed in the downstream transport and/or treatment device, it is further possible to stop the destacking screw independently of the drive of the downstream transport and/or treatment device. In other words, the downstream transport and/or treatment device continues to operate in the event of an interruption of production, while the destacking screw is stopped. This was hitherto impossible due to the coupling of the destacking screw to the drive of the downstream transport and/or treatment device.

Due to the fact that the destacking screw can be driven independently of the downstream transport and/or treatment device, and thus can also be stopped independently, the destacking screw fulfills not only the function of a device for conveying can lids from a supply of lids fed in via a lid feed, and transferring the lids, correctly separated, to a downstream transport and/or treatment device, but also the function of a stopping device for withholding the can lids in the event of an interruption of production.

Accordingly, if, for example, no lids need to be provided for closing filled cans, the destacking screw can be stopped, while the downstream transport and/or treatment device continues to operate in order not to hinder the filling process unnecessarily, and in order to avoid stopping the filling plant as a whole. If the destacking screw is stopped, no further lids are conveyed. Because of this, it is no longer necessary to provide an additional stopping device for retaining the lids.

If it is then intended to resume the conveying of lids, the drive of the destacking screw is restarted and lids are accordingly conveyed. This dispenses with elaborate extension and retraction of a stopping device by means of an additional pneumatic control device.

In some embodiments, the destacking screw has a separate drive, for example a servo drive, wherein the separate drive can be operated independently of the drive of the downstream transport and/or treatment device. With the aid of the servo drive, it is possible to control the speed of rotation and the acceleration of the destacking screw drive, enabling perfect synchronization with the production or closing procedure.

The drive of the destacking screw is generally synchronized with the drive of the downstream transport and/or treatment device, in order that, following an interruption of production, the destacking screw can be re-synchronized with the downstream transport and/or treatment device, and accordingly the supply of correctly separated lids can again be achieved.

In several embodiments, the drive of the destacking screw is synchronized with the drive of the downstream transport and/or treatment device via a software coupling, for example via Drive—PLC (Powerline Communication).

The downstream transport and/or treatment device specifies the speed of reception of the lids that are to be supplied, along with their separation. After the destacking screw has stopped, independently of the downstream transport and/or treatment device, the destacking screw must be restarted at the correct time. This is achieved by means of the software coupling, for example a Drive—PLC, between the destacking screw and the downstream transport and/or treatment device. By this means the speed and acceleration of the downstream transport and/or treatment device is captured, and the destacking screw is started up in accordance with this. It is thereby achieved that the destacking screw has reached a dispensing speed and separation of lids which exactly corresponds to the reception speed and separation of lids in the downstream transport and/or treatment device as soon as cans to be closed are again conveyed in the downstream transport and/or treatment device following an interruption of production, and lids need to be supplied.

In certain embodiments, the destacking screw is mechanically coupled with the downstream transport and/or treatment device, and is driven via the drive of the downstream transport and/or treatment device, wherein the destacking screw can be decoupled from the downstream transport and/or treatment device in order to interrupt the supplying of lids. The destacking screw can also be driven via a movement of the carousel of the can filler, or via a movement of a can seamer, such that it can be coupled.

In other words, in an operating state in which lids are intended to be conveyed, the destacking screw is mechanically connected with the downstream transport and/or treatment device, or the carousel of the can filler, or a can seamer, such that it is driven via the drive of the downstream transport and/or treatment device, or the can filler, or a can seamer. In an operating state in which no lids are intended to be conveyed, i.e., when the destacking screw needs to be stopped, the mechanical connection between the destacking screw and the downstream transport and/or treatment device, or the carousel of the can filler, or a can seamer, is temporarily disengaged, with the result that the destacking screw is no longer driven by the drive of the downstream transport and/or treatment device, or the can filler, or a can seamer. In the decoupled state, the downstream transport and/or treatment device, or the carousel of the can filler, or the can seamer continue to be driven, while the destacking screw is no longer driven, and in consequence conveys no lids.

By means of the mechanical and disengageable coupling of the destacking screw with the downstream transport and/or treatment device, or the carousel of the can filler, or the can seamer, it is possible to provide a simple mechanism by which the destacking screw can be stopped independently of the drive of the downstream transport and/or treatment device, or the can filler, or the can seamer, i.e., the conveying of lids can be interrupted independently of the operation of the downstream transport and/or treatment device, or the can filler, or the can seamer. It is also unnecessary to provide an additional stopping device, since in its coupled state the destacking screw fulfills the function of a conveying device, and in its decoupled state it fulfills the function of a stopping device, since it is no longer driven by the drive of the downstream transport and/or treatment device, or the can filler, or the can seamer.

In various embodiments, the downstream transport and/or treatment device is a gassing starwheel for gassing the can lids. "Gassing" is to be understood in a general sense as the addition of a protective gas to the contents of a package after evacuation, or gas rinsing, for example in order to extend shelf life. In order to keep the amount of oxygen absorbed during can filling low, the air is displaced from the head space of the can after filling, immediately before closing, by means of a lid gassing with inert gas. Gassing is also used in order, by means of a suitable gas, to kill germs on packaged goods, packaging and packaging materials.

The downstream transport and/or treatment device can generally also be a can seamer.

BRIEF DESCRIPTION OF FIGURES

Further embodiments are more fully explained by the description below of the figures, in which.

DETAILED DESCRIPTION

Exemplary embodiments are described below with the aid of the figures. In the figures, elements which are identical or similar, or have identical effects, are designated in the individual figures with identical reference signs. In order to avoid redundancy, repeated description of these elements is in part dispensed with.

Figure 1A:
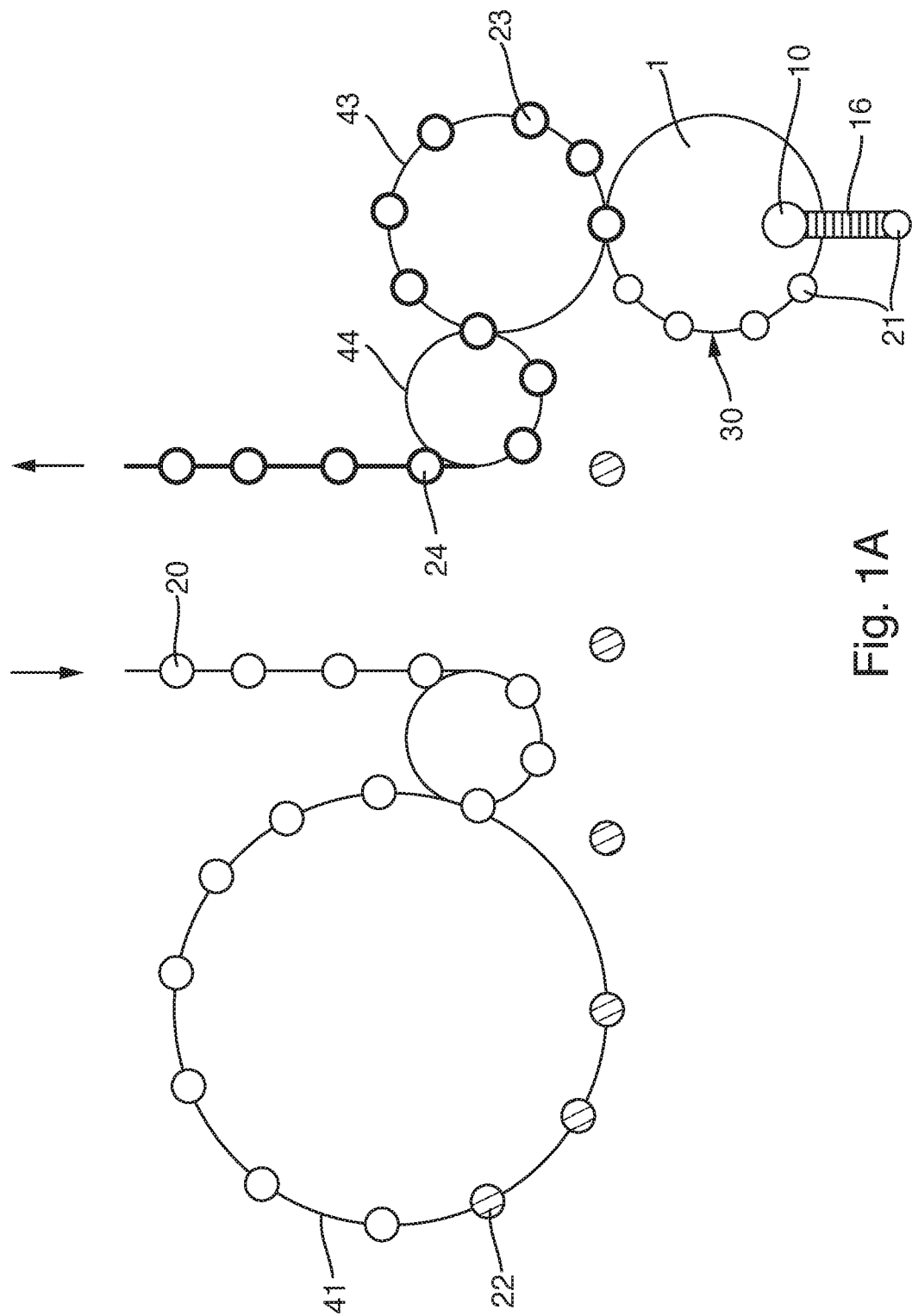
FIG. 1A is a schematic plan view of a discharge area of a filler carousel with a downstream can seamer, during the transfer of lids.

FIG. 1A shows a schematic plan view of a discharge area of a can filler 41, which is adjoined by a schematically represented seamer 43. The cans 20 that are to be filled are filled with the desired product in the can filler 41.

The basic process of filling the cans 20 in the can filler 41 includes for example the following steps: introducing the cans 20 that are to be filled into the can filler 41, rinsing the cans 20 with carbon dioxide ($CO_2$) and pre-pressurizing with $CO_2$, filling with a carbonated filling product, and releasing pressure slowly in order to avoid foaming.

In a further mode of operation, non-carbonated filling products can also be filled, in which case at least the pre-pressurizing of the cans 20 with $CO_2$ can be dispensed with.

As shown in FIG. 1A, the cans 22 that have been filled in this manner are initially transported without lids 21 out of the can filler 41 following the filling process.

In order to be able to close the filled cans 22, suitable can lids 21 must be supplied. The supplying of can lids 21 takes place in a device 1 for supplying can lids. Here, lids 21 that are supplied in a lid feed 16 are, by means of a rotating destacking screw 10, removed and transferred to a downstream transport device 30. The downstream transport device 30 is designed here as a conveyor in the form of a transport starwheel, into whose transport pockets the lids that have been removed from the stack by the destacking screw 10 are transferred.

The lids 21 are transferred from the downstream transport device 30 to a seamer 43, in which the cans 23 and the lids 21 are joined together in such a manner that a gas-tight and fluid-tight package is formed. In the seamer 43, the lids 21 can be placed upon the cans 20 and then attached thereto in a gas-tight and fluid-tight manner.

The transfer of the lids 21 to the cans 20 can, however, in principle also take place at another position upstream of the seamer.

Figure 1B:
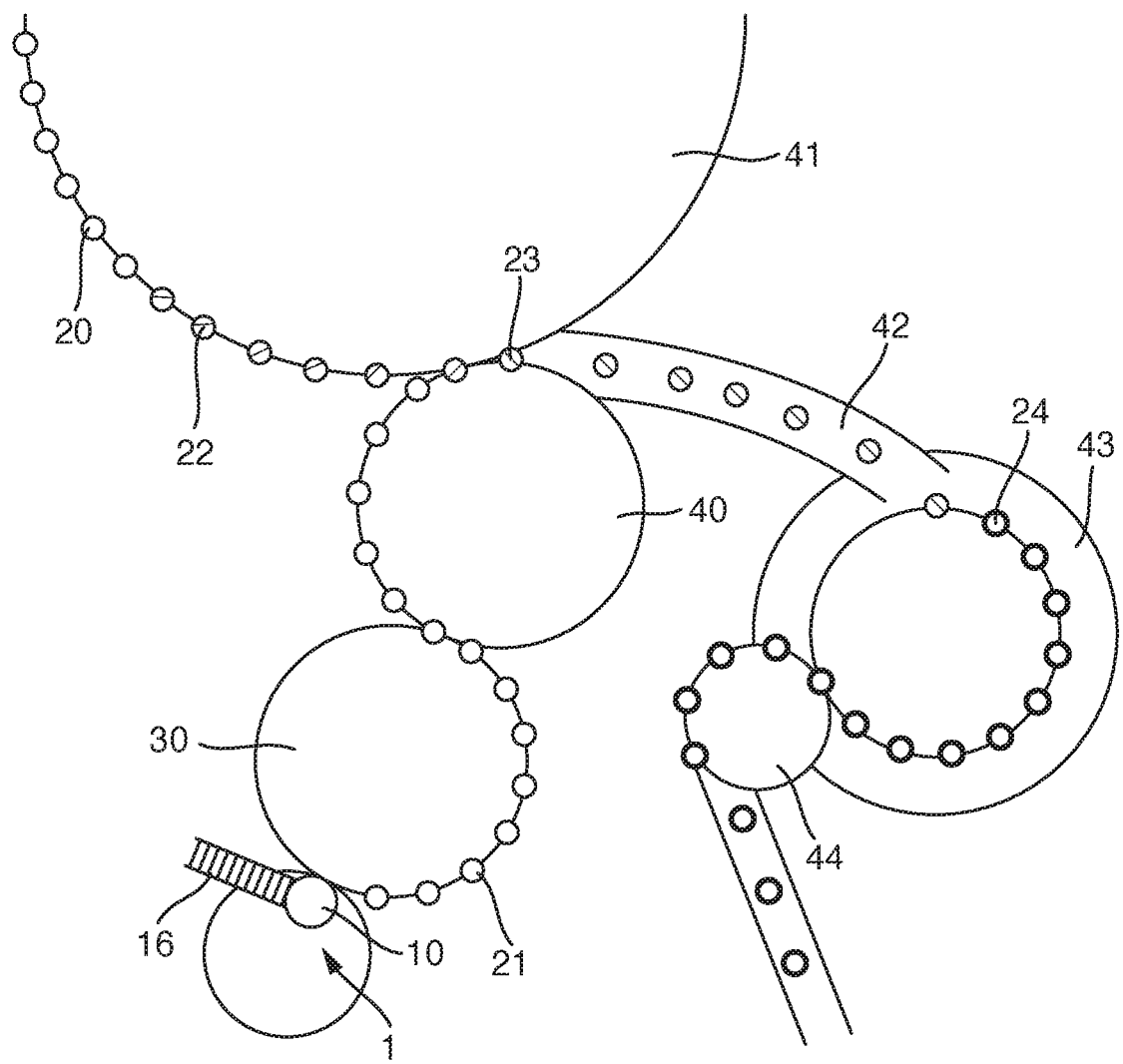
FIG. 1B is a schematic plan view of a discharge area of a filler carousel of a can filler and a downstream can seamer, during the transfer of lids, in a further embodiment.

An alternative embodiment of the device is represented in FIG. 1B, which shows schematically a plan view of a discharge area of a can filler 41, which is adjoined by a schematically shown seamer 43. In the can filler 41, cans 20 that are to be filled are filled with the desired filling product.

As also shown in FIG. 1A, in the embodiment represented in FIG. 1B the cans 22 that have been filled in this manner are similarly initially transported without lids 21 out of the can filler 41 after the filling process.

In order that the filled cans 22 can be closed, suitable can lids 21 must be provided. The provision of the can lids 21 takes place in a device 1 for supplying can lids. Here, lids 21 that are supplied in a lid feed 16 are, by means of a rotating destacking screw 10, removed and transferred to a downstream transport and/or treatment device 30. The downstream transport and/or treatment device 30 can for example be designed as a gassing starwheel, wherein the lids 21 are gassed with inert gas in order to displace oxygen, or gassed with a suitable gas to kill germs. The lids 21 are transported from the downstream transport and/or treatment device 30 via a transport starwheel 40, and placed upon the filled cans 22. Filled cans 23, upon which lids 21 have been placed, are then conveyed via a transport belt 42 to a seamer 43, in which the cans 23 and the lids 21 placed on them are joined in such a manner that a gas-tight and fluid-tight package is formed. The seamer 43 thereby includes the following elements which are not shown: a lifter plate mounted on springs, a seaming head and a seaming roller.

When a can 23 is closed in the seamer 43, the lid 21, which has been placed on the can 23 is, in two sequential steps, seamed to the rim of the can 23 sufficiently tightly to close the can 23 in a gas-tight and fluid-tight manner. In the first step, the cans 23 to be closed are raised in the seamer 43 by the lifting plate and pressed with their lids 21 against a seaming head. The seaming head, which rotates with the can, holds the lid 21 in position, while the seaming roller, which rotates in the opposite direction, presses against the seaming head and thereby bends the outer part of the lid 21 downwards around the can seam of the can 23. In a second step, the gas-tight and fluid-tight closure between the can 23 and the lid 21 is produced by pressure from the seaming roll. Closed cans 24 are transported via a discharge starwheel 44 out of the seamer 43 and, for example, transferred to an inspection device (which is not shown) to check the fill height.

Figure 2:
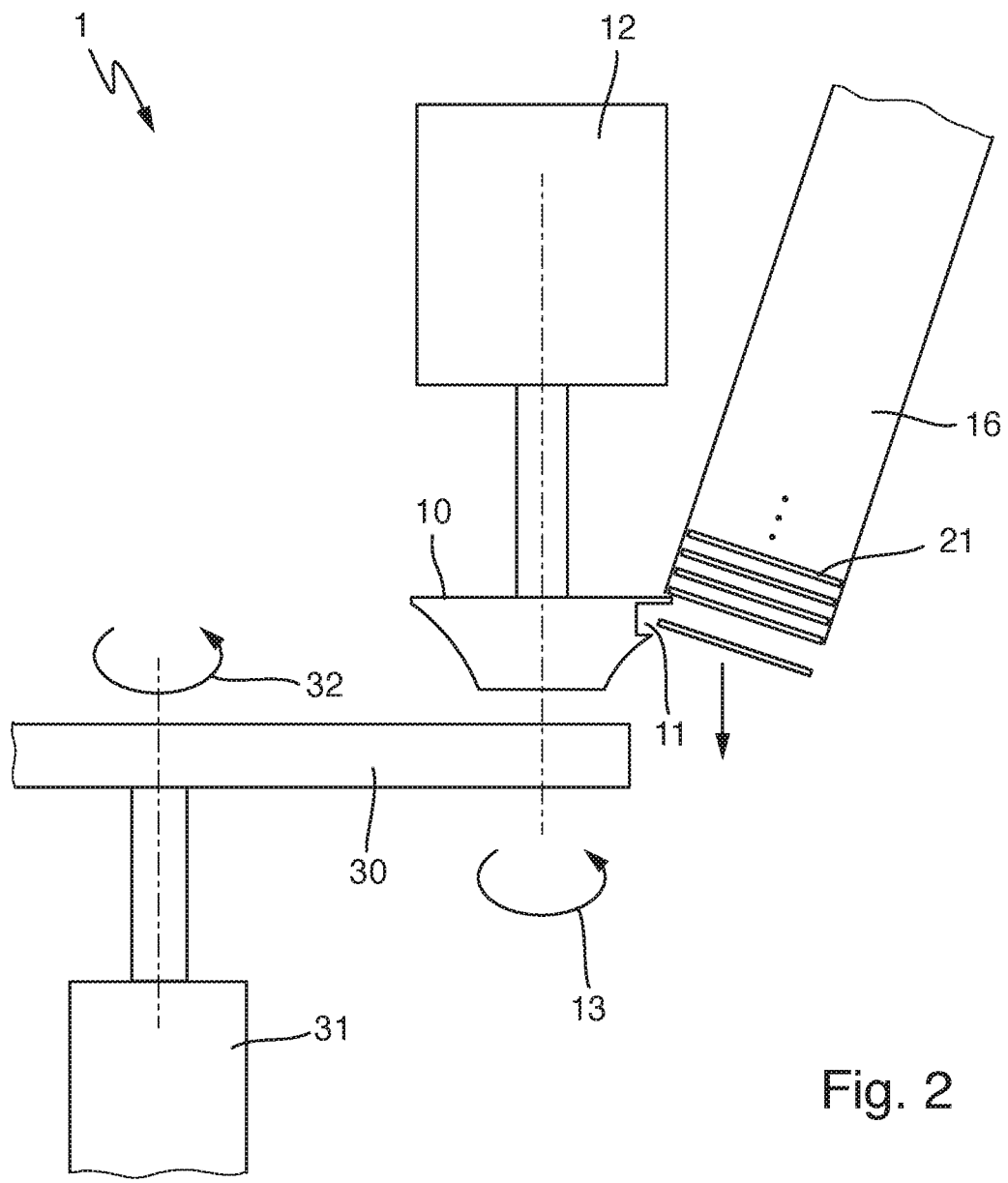
FIG. 2 is a schematic, partially sectional side elevation of a device for supplying lids to a can seamer, to which lids are conveyed by a destacking screw driven by its own drive.

FIG. 2 shows a schematic, partially sectional side elevation of the device 1 for supplying lids 21 to the can seamer 43, to which the lids 21 are conveyed by a destacking screw 10 driven by its own drive 12. The drive 12 is generally a servo drive or another type of individually controllable actuator.

The lids 21 that are to be conveyed are supplied in the lid feed 16, which is disposed immediately above the destacking screw 10. The lids 21 are conveyed downwards towards the destacking screw 10 either by gravity alone or by a suitable drive, which is not shown here. The destacking screw 10 is driven by the drive 12 to carry out a rotational movement in a direction indicated by the arrow 13. The destacking screw 10 has a helical groove 11, which in each case engages with a rim area of an individual lid 21. The helical groove 11 is formed such that it can remove a single lid 21 from the lid feed 16, and convey it by means of the rotational movement 13 of the destacking screw 10 downwards in the direction of the downstream transport and/or treatment device 30, to which it discharges the lid 21. After the discharge of a single lid 21 to the downstream transport and/or treatment device 30, the destacking screw 10 rotates further, and can again take an individual lid 21 from the lid feed 16 and convey it to the downstream transport and/or treatment device 30.

FIG. 2 also shows the transport and/or treatment device 30 which is downstream of the destacking screw 10, and which has a separate drive 31. The downstream transport and/or treatment device 30 rotates in the direction indicated by an arrow 32.

The drive 31 of the downstream transport and/or treatment device 30 and the drive 12 of the destacking screw 10 are synchronized with each other such that the speed at which the destacking screw 10 discharges lids 21 from the lid feed 16 corresponds exactly to the speed at which the downstream transport and/or treatment device 30 receives them. In this manner it is ensured that a lid 21 is supplied at the correct time for each can (not shown in FIG. 2) which is to be filled and closed, thereby avoiding delays and malfunctions.

Figure 3:
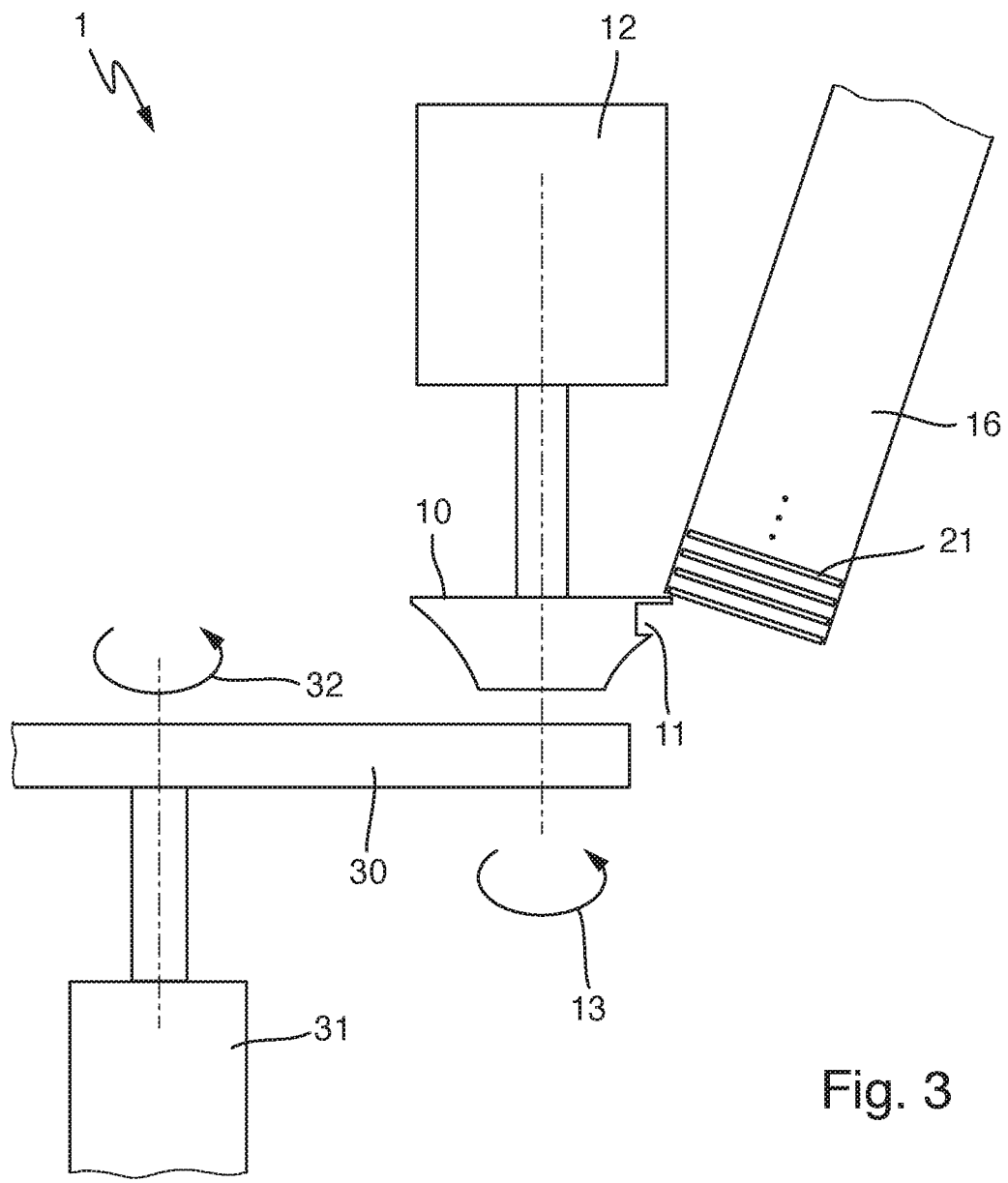
FIG. 3 is the device from FIG. 2, wherein the drive of the destacking screw is stopped and no lid is conveyed.

FIG. 3 shows the device 1 from FIG. 2, wherein the drive 12 of the destacking screw 10 is stopped and no lids 21 are conveyed. In contrast to FIG. 2, no lids 21 are now transferred from the destacking screw 10 to the downstream transport and/or treatment device 30. This is the case, for example, when no cans 23 that are to be closed are conveyed in the downstream transport and/or treatment device 30, and thus no lids 21 need to be supplied. As in FIG. 2, the transport and/or treatment device 30 which is downstream of the destacking screw 10 is driven by means of the drive 31 in the direction indicated by the arrow 32. Unlike in FIG. 2, however, the destacking screw 10 is stopped, i.e., it is no longer driven by the drive 12. The downstream transport and/or treatment device 30 thus continues to rotate, while the destacking screw 10 is stationary. Because the destacking screw 10 can only convey lids by means of the helical groove 11 when it is driven, i.e., rotated, by the drive 12, no lids 21 are conveyed when the destacking screw 10 is stationary. When it is not driven, the destacking screw 10 thereby fulfills the function of a stopping device. As shown in FIG. 3, the stationary destacking screw 10 stops the supply of lids 21 stored in the lid feed 16 when it is not in motion, and by this means no lids 21 are conveyed to the downstream transport and/or treatment device 30. Due to the fact that the destacking screw 10 can be stopped independently of the drive 31 of the downstream transport and/or treatment device 30, it fulfills the function of a conveying and stopping device, and because of this no additional stopping device is needed in order to withhold the lids 21 in the event of an interruption of production.

FIGS. 4A to 4E show a schematic representation in a plan view of the synchronization of the drive 12 of the destacking screw 10 and the drive 31 of the downstream transport and/or treatment device 30. The synchronization includes the phases of coupling, synchronous operation and decoupling. "Coupling" is to be understood as the step in which, after a period in which the destacking screw 10 is stopped, for example due to an interruption of production, during which the drive 31 of the downstream transport and/or treatment device 30 has continued to operate, the drive 12 of the destacking screw 10 is restarted, in order to accelerate in good time to the speed of the drive 31 of the downstream transport and/or treatment device 30.

Figure 4A:
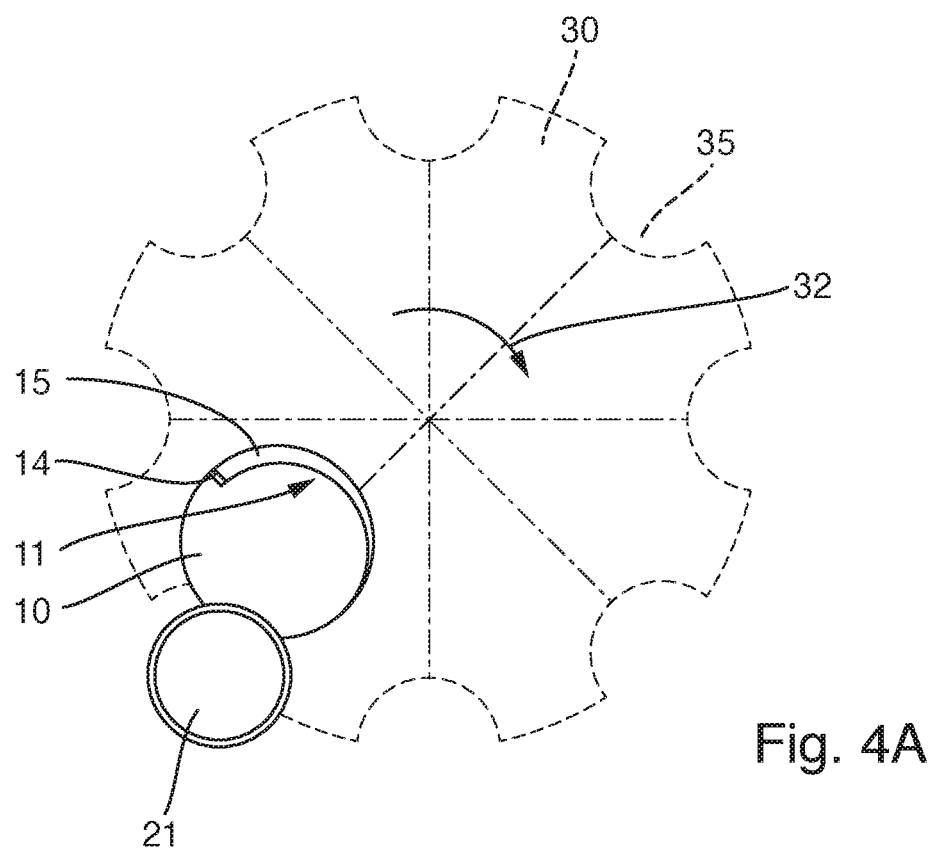
FIGS. 4A to 4E are a schematic representation in a plan view of the synchronization of the drive of the destacking screw and the drive of a downstream transport and/or treatment device.

FIG. 4A shows a schematic plan view of a possible arrangement of the destacking screw 10 relative to the downstream transport and/or treatment device 30 and a lid 21. The destacking screw 10 has a helical groove 11 with a crescent-shaped bevel 15 and a separating blade 14. The helical groove 11 and the crescent-shaped bevel 15 serve to take a single lid 21 from a lid feed (not shown in FIG. 4A), and convey it in the direction of the downstream transport and/or treatment device 30 by means of a rotational motion 13. With the aid of the separating blade 14, the lid 21 is then discharged to the downstream transport and/or treatment device 30, and the destacking screw 10 can take a new individual lid 21 from the lid feed 16. The downstream transport and/or treatment device 30 has along its circumference a plurality of pockets 35, into which the lids 21 that are conveyed by the destacking screw 10 are discharged.

Figure 4B:
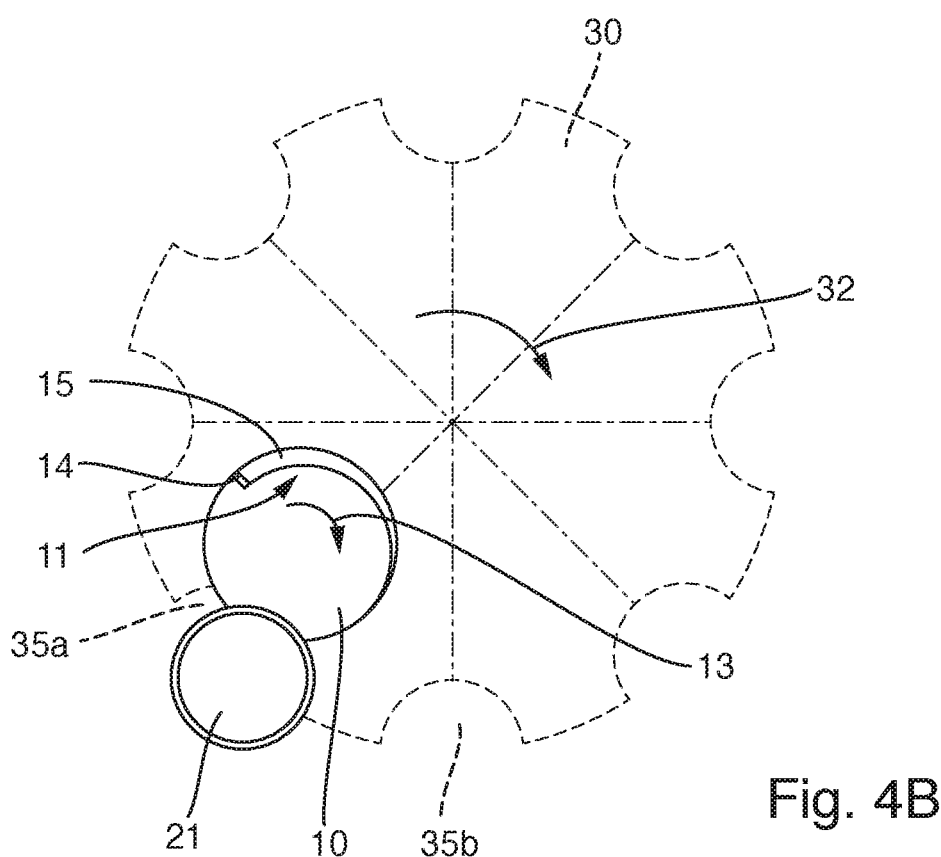

FIG. 4B shows the initial position of the destacking screw 10 and the downstream transport and/or treatment device 30. The term "initial position" describes the state in which the destacking screw 10 is stationary, i.e., does not rotate, due to an interruption of production. The downstream transport and/or treatment device 30, on the other hand, is driven by the drive 31, and rotates in the direction of the arrow 32. In this state, the destacking screw 10 fulfills the function of a stopping device; the lid 21 is thus not conveyed, but retained in the lid feed. As can be seen in FIG. 4B, the lid 21 lies on the destacking screw 10, but not on the crescent-shaped bevel 15. If the interruption of production ceases, the drive 12 of the destacking screw 10 must be restarted. This takes place in the coupling step. The drive 12 begins to drive the destacking screw 10, in order to enable a lid 21 to be supplied in good time. The signal to start the drive 12 is given one section in advance, i.e., at a first pocket 35a, in order that a lid 21 can be supplied at the correct time for a subsequent pocket 35b. By the time the destacking screw 10 is above the second pocket 35b, it has already reached the required speed.

Figure 4C:
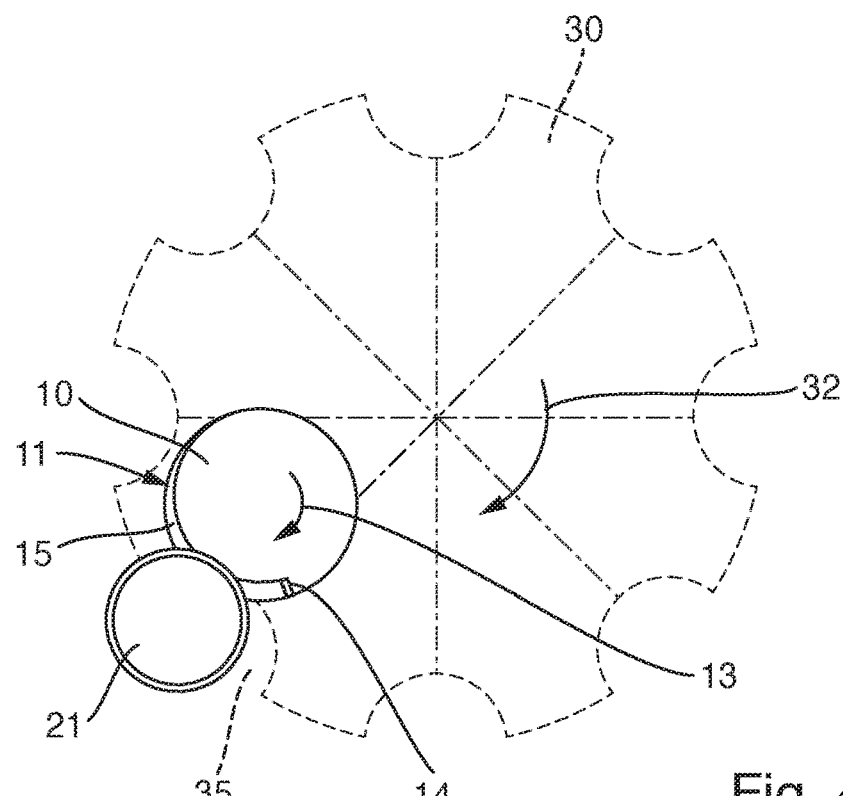

In FIG. 4C, the synchronous position of the drive 12 of the destacking screw 10 and the drive 31 of the downstream transport and/or treatment device 30 is shown schematically. As described in relation to FIG. 4B, the drive 12 accelerates to the synchronous position. At this synchronous position, synchronous operation of the destacking screw 10 and the downstream transport and/or treatment device 30 is established, and a lid 21 is separated from the lid feed 16 by means of the crescent-shaped bevel 15 and the separating blade 14.

Figure 4D:
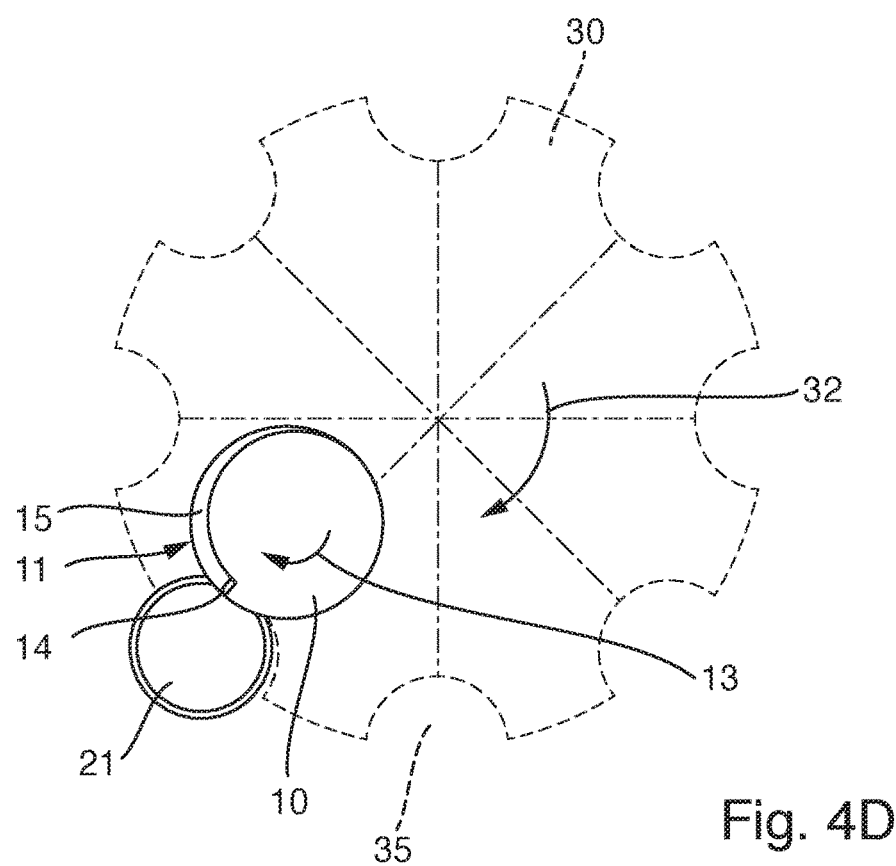

In FIG. 4D, the synchronous operation of the drive 12 of the destacking screw 10 and the drive 31 of the downstream transport and/or treatment device 30 is shown schematically. In synchronous operation, the speed at which lids 21 are supplied by the destacking screw 10 corresponds to the reception speed of the downstream transport and/or treatment device 30. In synchronous operation, the destacking screw 10 rotates precisely fast enough for exactly one lid 21 to be supplied at the correct time to each pocket 35, i.e., discharged by the destacking screw 10 with the aid of the separating blade 14 to a pocket 35. The synchronous operation continues until an interruption of production occurs, i.e., as long as lids 21 need to be supplied to the downstream transport and/or treatment device 30.

Figure 4E:
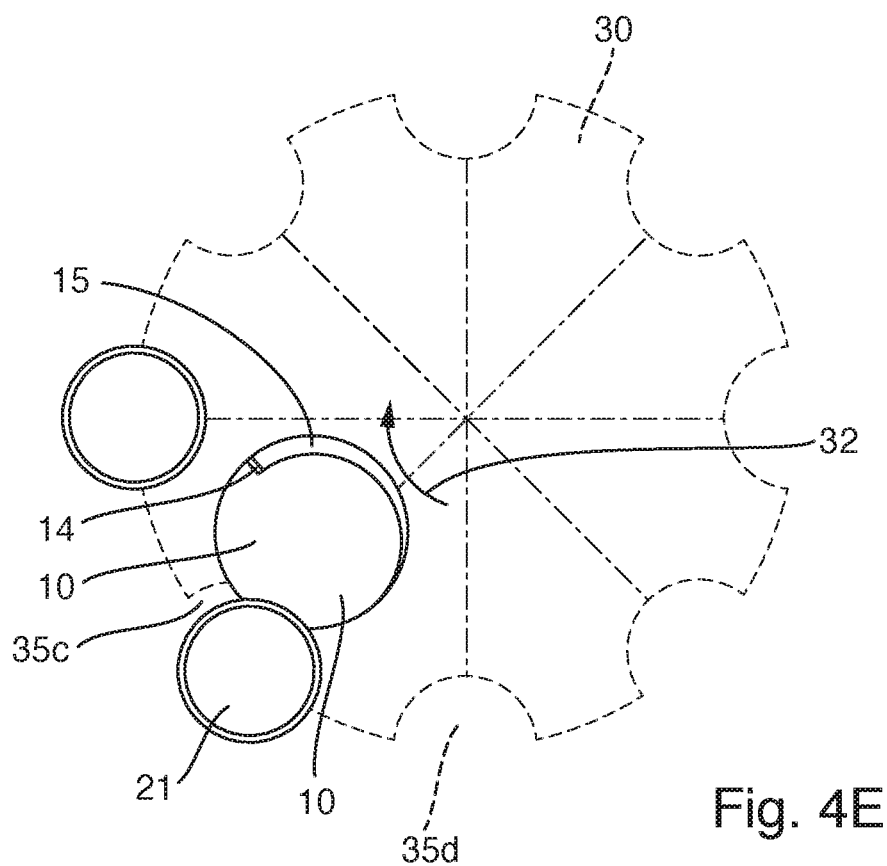

In FIG. 4E, the decoupling position is shown schematically. The term "decoupling" means that the destacking screw 10 is decelerated and stopped in the event of an interruption of production, while the downstream transport and/or treatment device 30 continues to be driven. If an interruption of production occurs, the signal to stop the destacking screw 10 is given one section in advance, i.e., at a first pocket 35c, in order that no further lid 21 is supplied at a subsequent pocket 35d. The deceleration of the destacking screw 10 therefore takes place in the area of the first pocket 35c, so that the destacking screw 10 has already become fully stationary in the area of the second pocket 35d, and thus does not dispense a lid 21 to the pocket 35d. Instead, it again fulfills the function of a stopping device, as described in relation to FIG. 4B.

Figure 5:
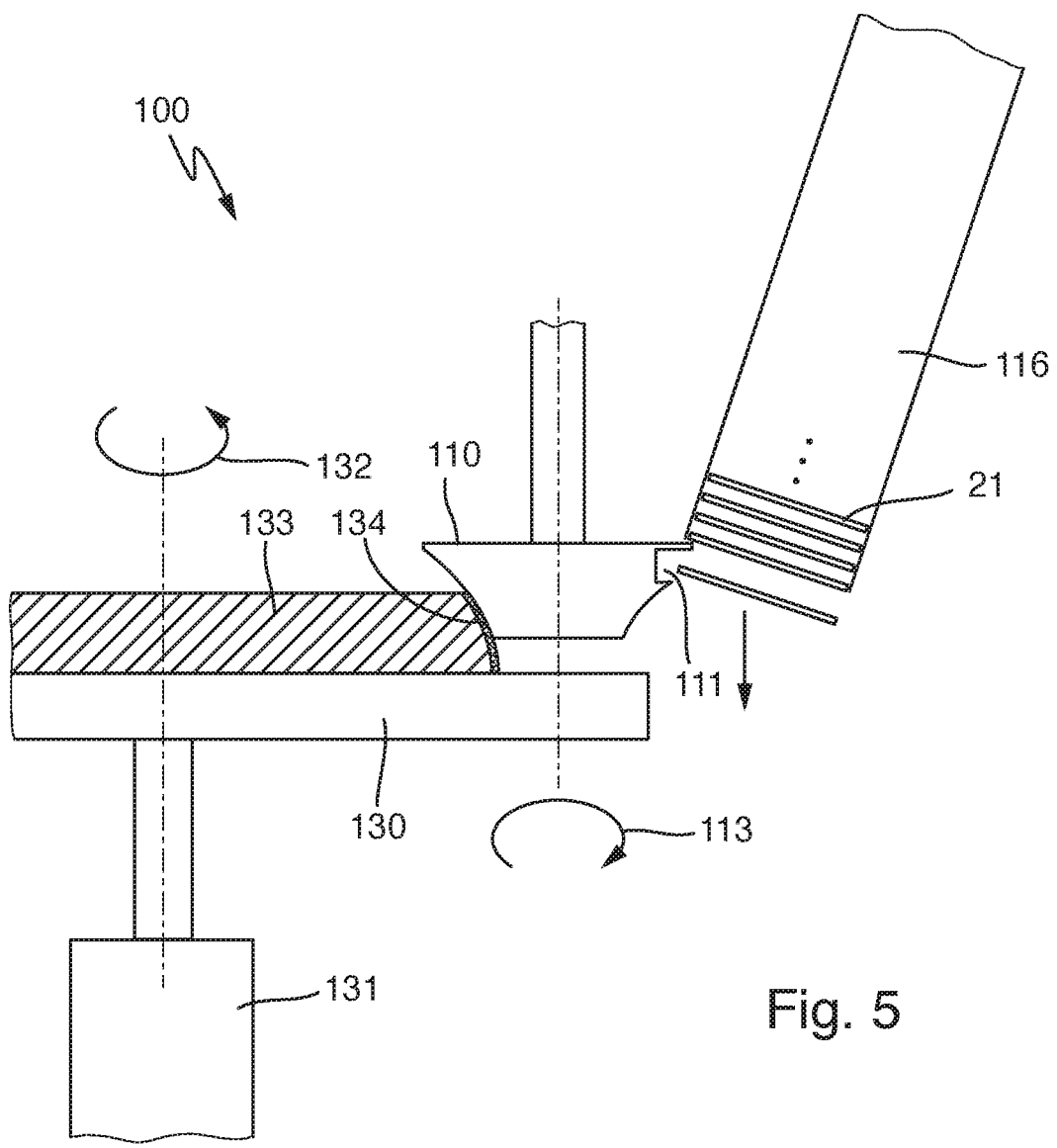
FIG. 5 is a schematic, partially sectional side elevation of a device for supplying lids to a can seamer, wherein a destacking screw is mechanically coupled to the downstream transport and/or treatment device to which lids are conveyed.

FIG. 5 shows a schematic, partially sectional side elevation of a device 100 for supplying lids 121 to a can seamer 143, wherein a destacking screw 110 is mechanically coupled to a downstream transport and/or treatment device 130, and lids 121 are conveyed. The lids 121 that are to be conveyed are supplied via a lid feed 116, which is disposed immediately above the destacking screw 110. The lids 121 are conveyed downwards towards the destacking screw 110 either by gravity alone or by a suitable drive, which is not shown here. FIG. 5 also shows, downstream of the destacking screw 110, a transport and/or treatment device 130, which has a drive 131. The downstream transport and/or treatment device 130 rotates in the direction indicated by an arrow 132. The downstream transport and/or treatment device 130 has a mechanical coupling device 133 with a coupling area 134. This mechanical coupling device 133 is detachably connected with the destacking screw 110 via the coupling area 134, such that the destacking screw 110 is driven, i.e., rotated, in the direction indicated by an arrow 113 by means of the drive 131 of the downstream transport and/or treatment device 130.

The destacking screw 110 thus has no drive of its own, being instead coupled with the drive 131 of the downstream transport and/or treatment device 130 in such a manner that it can be decoupled. The destacking screw 110 has a helical groove 111, which can remove in each case a single lid 121 from the lid feed 116 and transfer it to the downstream transport and/or treatment device 130. The helical groove 111 is formed such that it can remove an individual lid 121 from the lid feed 116, and convey it by means of the rotational movement 113 of the destacking screw 110 downwards in the direction of the downstream transport and/or treatment device 130, upon which it discharges the lid 121. After the discharge of a single lid 121 to the downstream transport and/or treatment device 130, the destacking screw 110 rotates further, and can again take an individual lid 121 from the lid feed 116 and convey it to the downstream transport and/or treatment device 130.

Figure 6:
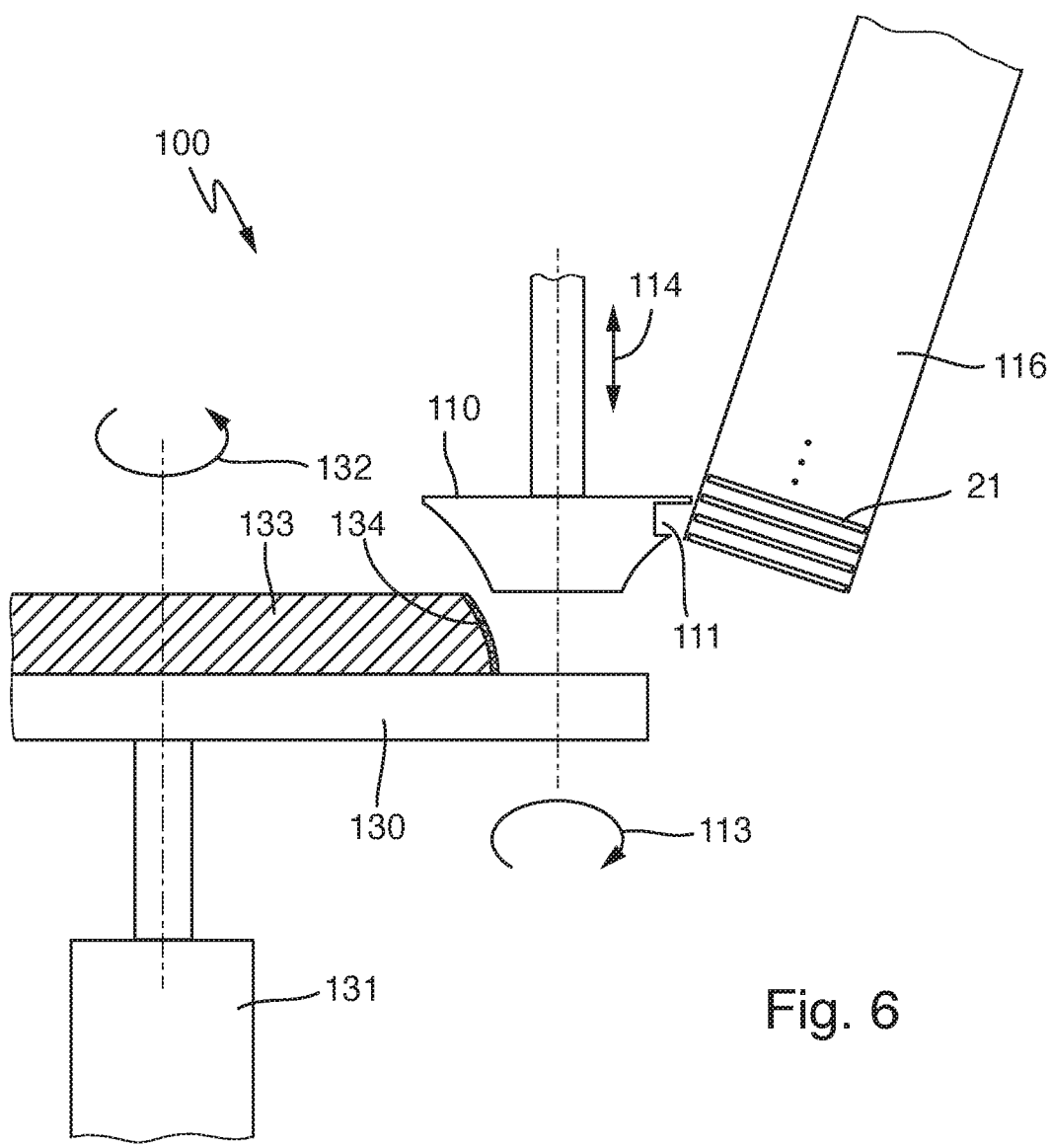
FIG. 6 is the device from FIG. 5, wherein the destacking screw is decoupled from the downstream transport and/or treatment device and no lids are conveyed.

FIG. 6 shows the device 100 from FIG. 5, wherein the destacking screw 110 is decoupled from the downstream transport and/or treatment device 130 and no lids 21 are conveyed. In contrast to FIG. 5, no lids 21 are now discharged by the destacking screw 110 to the downstream transport and/or treatment device 130. This is the case, for example, when no cans 23 that are to be closed are conveyed in the downstream transport and/or treatment device 130, and thus no lids 21 need to be supplied. As in FIG. 5, the transport and/or treatment device 130, which is downstream of the destacking screw 110, is driven by means of a drive 131 in the direction indicated by the arrow 132.

In contrast to FIG. 5, however, the destacking screw 110 is stopped. The destacking screw 110 is decoupled from the coupling area 134 of the mechanical coupling device 133. In the decoupled state, the destacking screw 110 is no longer driven by the drive 131 of the downstream transport and/or treatment device 130. The coupling and/or decoupling of the destacking screw 110 and the mechanical coupling device 133 can take place by means of a vertical or horizontal displacement of the destacking screw 110 or the mechanical coupling device 133, as indicated by way of example by an arrow 114. The downstream transport and/or treatment device 130 thus continues to rotate, while the destacking screw 110 is stationary.

Due to the fact that the destacking screw 110 can only convey lids 21 by means of the helical groove 111 when it is driven, i.e., rotated, by the drive 112, no lids 21 are conveyed when the destacking screw 110 is stationary. When it is not being driven, the destacking screw 110 accordingly fulfills the function of a stopping device. As shown in FIG. 6, the stationary destacking screw 110 stops the lids 21 stored in the lid feed 116, and because of this no lids 21 are conveyed to the downstream transport and/or treatment device 130. Due to the fact that the destacking screw 110 can be stopped independently of the drive 131 of the downstream transport and/or treatment device 130, i.e., can be decoupled from the drive 131 of the downstream transport and/or treatment device 130, it fulfills the function of a conveying and stopping device. As a result, no additional stopping device is necessary to retain the lids 21 in the event of an interruption of production.

To the extent applicable, all individual features described in the example embodiments can be combined with each other and/or exchanged, without departing from the field of the invention.

What is claimed is:

1. A device for supplying lids, comprising:
a destacking screw configured to:
    convey lids that are fed in via a lid feed,
    transfer separated lids to a transport pocket of a downstream transport and/or a treatment device, and
    interrupt a supply of the lids to the downstream transport and/or the treatment device in an interruption of production,
wherein;

the downstream transport and/or the treatment device comprises a conveyor in a form of a transport starwheel, the destacking screw is driven by a separate drive, the separate drive is configured to be operated independently of a drive of the downstream transport and/or the treatment device, the separate drive comprises a servo drive, and the separate drive is synchronized with the drive of the downstream transport and/or the treatment device via a software coupling.

2. The device of claim 1, wherein the downstream transport and/or the treatment device further comprises a gassing starwheel configured to gas the lids.

3. The device of claim 1, wherein the downstream transport and/or the treatment device further comprises a can seamer.

4. A method for supplying lids, which comprises:

conveying, by a destacking screw, lids to a transport pocket of a downstream transport and/or a treatment device, wherein the downstream transport and/or the treatment device comprises a conveyor in a form of a transport starwheel;

stopping the destacking screw to interrupt the conveying of the lids; and synchronizing a drive of the downstream transport and/or the treatment device with a drive of the destacking screw via a software coupling, wherein:

stopping the destacking screw comprises stopping the drive of the destacking screw, the destacking screw is driven by a separate drive, the separate drive is configured to be operated independently of the drive of the downstream transport and/or the treatment device, and the separate drive comprises a servo drive.

5. The method of claim 4, further comprising operating the downstream transport and/or the treatment device while the destacking screw is stopped.

6. The method of claim 4, further comprising re-starting the drive of the destacking screw to resume the conveying of the lids.

7. The method of claim 4, further comprising controlling a speed of rotation and an acceleration of the drive of the destacking screw.

* * * * *